May 15, 1951 W. H. JOHNSON 2,552,791
SOCKET AND HOSE ASSEMBLY
Filed Oct. 20, 1949
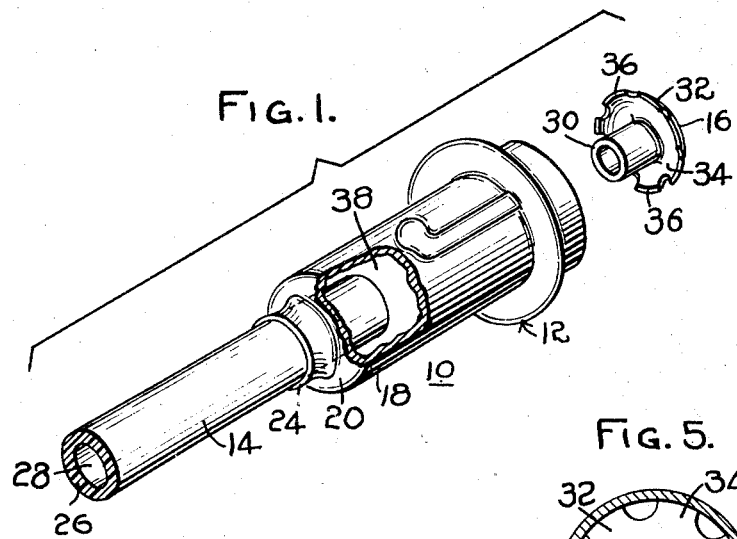
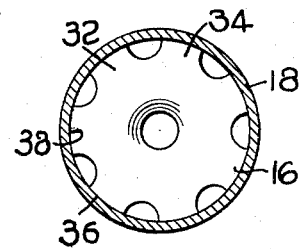
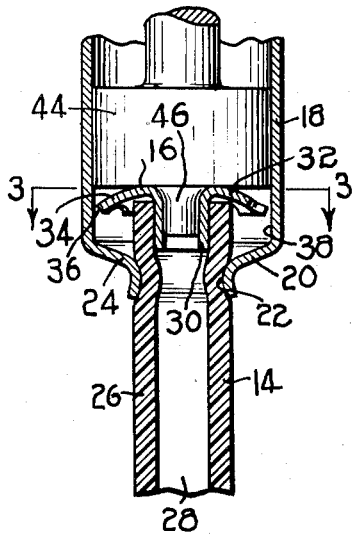
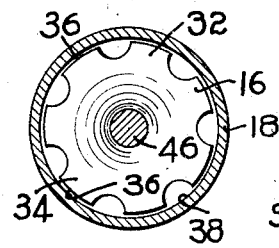
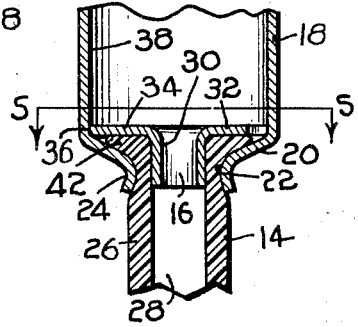
INVENTOR:
WARREN H. JOHNSON,
By Philip E. Parker
ATTORNEY.

Patented May 15, 1951

2,552,791

UNITED STATES PATENT OFFICE 2,552,791

SOCKET AND HOSE ASSEMBLY

Warren H. Johnson, Everett, Mass., assignor to United-Carr Fastener Corporation, Cambridge, Mass., a corporation of Massachusetts Application October 20, 1949, Serial No. 122,501

2 Claims. (Cl. 285—84)

This invention relates generally to a socket and hose assembly, and has particular reference to a socket member having a flexible hose assembled therewith for carrying electrical lead wires to a switch or other electrical device disposed in the socket.

The object of this invention is to provide a socket and hose assembly in which a flexible hose is disposed through an opening in the socket and is secured therein by external and internal hose engaging means to effect a watertight seal therebetween.

A further object of the invention is to provide a housing and hose assembly in which a flexible hose having a compressible wall has an end assembled in an opening on the housing, and is maintained in watertight engagement therewith by a hose-engaging eyelet disposed in the end of the hose.

A still further object of the invention is to provide a housing and hose assembly in which an elastic hose end is disposed in an opening into the housing, and an eyelet having a shank extending into the hose end to form a watertight seal between the hose and the housing is retained in place by means thereon for frictionally engaging the inner wall of the housing.

Other objects of the invention will, in part, be obvious, and will, in part, appear hereinafter. For a fuller understanding of the nature and objects of the invention, reference should be had to the following detailed description, taken in conjunction with the accompanying drawing, in which:

Fig. 1 is a perspective view, partly broken away, of the component parts of the device;

Fig. 2 is a view in elevation, partly in section, of the component parts of the device in position for final assembly;

Fig. 3 is a view in section taken on line 3—3 of Fig. 2;

Fig. 4 is a view in elevation, partly in section, of the completely assembled device; and Fig. 5 is a view in section taken on line 5—5 of Fig. 4.

Referring to the drawing, there is illustrated a socket and hose assembly 10, which comprises a socket member 12 which is adapted to contain an article such as a switch or other electrical device (not shown) and a flexible hose 14 assembled with the socket by means of an internal hose retaining eyelet 16.

The socket 12 is preferably formed of sheet metal, and comprises a substantially cylindrical hollow body 18 having a base 20 at one end thereof, and a hose receiving opening 22 disposed centrally in the base. A collar 24 is provided on the base about the opening 22 to engage an assembled hose as will be hereinafter described. The hose 14 comprises a wall 26 which is preferably formed of flexible and compressible material such as natural or synthetic rubber or rubber-like plastic, and has an internal bore 28 to carry electrical lead wires (not shown) to the socket 12. The hose retaining eyelet 16 comprises a tubular shank 30 adapted to be assembled in the end of the hose, and an outwardly extending flange 32, which in the preferred embodiment is provided with arms 34 disposed about the outer periphery, having biting ends 36 which are adapted for frictional engagement with the adjacent inner surface 38 of the socket body 18, as will be more fully described hereinafter.

In the assembled device an end of the hose 14 is disposed in the opening 22, and the wall 26 of the hose end is turned outwardly inside the socket to form a flared end portion 42. The shank 30 of the eyelet extends into the bore 28 of the hose a sufficient distance to cooperate with the collar 24 to provide a watertight seal therebetween. To effect such a seal, the internal diameter of the collar 24 and the external diameter of the shank 30 of the eyelet must be in such relation to the thickness of the hose wall 26 as to cause substantial compression of the portion of the wall disposed therebetween when the device is assembled. The flange 32 is shaped and arranged to confine the flared hose end 42 between the flange and the base 20, to assist in providing a watertight and mechanically strong seal between the hose and the socket. To retain the eyelet in the assembled position, the arms 34 on the outer periphery of the flange have been forced into frictional engagement with the inner surface of the socket body in a manner to be described hereinafter.

The method of assembly of the device is best illustrated by reference to Fig. 2. An end of the hose 14 is inserted into the socket body through the opening 22 in the base, and the shank 30 of the eyelet is inserted into the end of the hose inside the socket. The flange 32 of the eyelet is initially bent or rounded downwardly as illustrated in Fig. 2 to reduce the diameter and enable the flange to freely enter the body 18. A die 44, having a central protruding mandrel 46, is then forced down onto the eyelet so that the mandrel 46 enters the tubular shank of the eyelet. As the die is forced further downwardly, the flange 32 is flattened, thereby forcing the arms 34 outwardly so that the ends 36 bite into engagement with the inner surface of the socket body and lock the eyelet into engagement therewith. At the same time, the shank 30 of the eyelet is forced into the opening 22 so that a peripheral section of the hose wall is compressed between the collar 24 on the base and the shank 30. During the operation, the mandrel 46 provides interior support for the tubular portion to prevent any undesired deformation thereof. The wall 26 of the end of the hose is squeezed outwardly during the assembly to form the flared end portion 42, which is thereby retained between the base 20 and the flange 32 of the eyelet.

Although in the illustrated embodiment, the eyelet is retained in the socket by the frictional engagement of the arms 34, it will be understood that other means may be provided on the flange to retain the eyelet in the assembled position without departing from the scope of the invention. For instance, a flange with a serrated edge may be used in many applications with equally good results, and in some cases, a flange which has merely a burr resulting from the eyelet forming operation, may be found to have adequate holding power.

Since certain other obvious modifications may be made in the device without departing from the scope of the invention, it is intended that all matter contained herein be interpreted in an illustrative and not in a limiting sense.

I claim:

1. A waterproof housing and hose assembly comprising a substantially tubular housing member, a flexible hose having compressible walls, and a hose-retaining member, said housing member having an annular, angularly inwardly extending flange at one end and an axially outwardly extending collar on the radially inner edge of said flange defining an opening of less diameter than the outer diameter of said hose, said hose-retaining member comprising a relatively inelastic tubular portion having an outer diameter substantially equal to the inner diameter of said hose and an outwardly extending circumferential flange at one end of the tubular portion provided with biting edges at the outer periphery of said flange and normally having a bowed cross-section with the outer periphery normally disposed intermediate the ends of the tubular portion, said hose extending into said housing member through said collar, said hose-retaining member being disposed within said housing member with the tubular portion extending within the hose and compressing the walls thereof between the tubular portion and said collar, the end of said hose disposed within said housing member being flared outwardly into engagement with said flange of said housing member, and said outwardly extending flange being flattened into tensioned biting engagement of the inner wall of said housing adjacent said flange.

2. A waterproof housing and hose assembly in accordance with claim 1 wherein the biting edge portions on the outer periphery of the hose-retaining member flange are provided by a series of outwardly extending tongues disposed thereon.

WARREN H. JOHNSON.

REFERENCES CITED

The following references are of record in the file of this patent:

UNITED STATES PATENTS

| Number | Name | Date |
|--------|------|------|
| 512,457 | Stone | Jan. 9, 1894 |
| 1,872,540 | White | Aug. 16, 1932 |
| 1,928,836 | Loughead | Oct. 3, 1933 |
| 2,432,598 | Weatherhead | Dec. 16, 1947 |